(12) United States Patent
Okitsu

(10) Patent No.: US 6,283,146 B1
(45) Date of Patent: Sep. 4, 2001

(54) PRESSURE REDUCING VALVE WITH PRESSURE GAGE IN HANDLE

(75) Inventor: Masayuki Okitsu, Ibaraki (JP)

(73) Assignee: SMC Corporation (JP)

( * ) Notice: Subject to any disclaimer, the term of this patent is extended or adjusted under 35 U.S.C. 154(b) by 0 days.

(21) Appl. No.: 09/533,159

(22) Filed: Mar. 23, 2000

(30) Foreign Application Priority Data

Jun. 22, 1999 (JP) ................................................. 11-175071

(51) Int. Cl.[7] ................................................. G05D 16/10
(52) U.S. Cl. ................. 137/505.26; 137/505.34; 137/557
(58) Field of Search .................. 137/505.26, 505.29, 137/505.34, 505.37, 505.42, 557

(56) References Cited

U.S. PATENT DOCUMENTS

| | | | | |
|---|---|---|---|---|
| 3,259,144 | * | 7/1966 | Taplin | 137/557 |
| 3,511,273 | * | 5/1970 | Bartholomaus | 137/557 |
| 6,182,692 | * | 2/2001 | Fischer et al. | 137/557 |

FOREIGN PATENT DOCUMENTS 4-45043 10/1992 (JP).

* cited by examiner

*Primary Examiner*—Stephen M. Hepperle
(74) *Attorney, Agent, or Firm*—Baker Botts L.L.P.

(57) ABSTRACT

A gage-in-handle type pressure reducing valve wherein a feedback chamber and a pressure gage are communicated with each other through a communicating passage between a feedback member and a pressure gage guide without using a pressure introducing hole in a valve body wall or a bonnet wall, and which is capable of minimizing friction occurring in a mechanism for converting the rotation of a handle into an axial movement of a pressure regulating spring retainer. A pressure gage guide is connected to the pressure gage. The feedback member is formed with a communicating hole communicating with the feedback chamber. The communicating hole is communicated with the pressure gage guide through a communicating line. A pressure regulating nut is rotatably supported in a bonnet. The pressure regulating spring retainer is supported in the bonnet so as to be axially movable but unable to rotate. Rotation of the handle causes the pressure regulating nut to rotate, and this, in turn, causes the pressure regulating spring retainer to move axially.

9 Claims, 4 Drawing Sheets

PRESSURE REDUCING VALVE WITH PRESSURE GAGE IN HANDLE

BACKGROUND OF THE INVENTION

The present invention relates to a pressure reducing valve in which a secondary fluid pressure is set by actuating a cylindrical handle and a pressure gage is disposed in the handle (hereinafter referred to as "a gage-in-handle type pressure reducing valve").

Japanese Utility Model Registration Application Post-Examination No. 4-45043 discloses a gage-in-handle type pressure reducing valve in which a valve chamber is disposed between a primary-side port (supply port) and a secondary-side port (output port), and a main valve element (supply valve element) in the valve chamber is urged toward a main valve seat (supply valve seat) by a valve spring (return spring). The main valve element is also urged away from the main valve seat by a pressure regulating spring fitted between a feedback member (diaphragm) and a pressure regulating spring retainer. In addition, a pressure gage is disposed in a cylindrical handle, and a feedback chamber between the feedback member and the valve chamber communicates with the pressure gage through a pressure introducing communicating passage. The axial position of the pressure regulating spring retainer is adjusted with the handle.

In the above-described prior art, the pressure introducing communicating passage for introducing the pressure in the feedback chamber into the pressure gage comprises pressure introducing holes in a valve body wall and a bonnet wall and a passage in a pressure regulating screw. A considerably large number of man-hours is needed to form the pressure introducing holes in the valve body wall and the bonnet wall by machining. In addition, it is necessary to provide four O-rings in order to make the passage in the pressure regulating screw air-tight. Thus, the prior art is unfavorably complicated in structure and costly.

SUMMARY OF THE INVENTION

A first object of the present invention is to provide a gage-in-handle type pressure reducing valve designed so that the feedback chamber and the pressure gage are communicated with each other through a communicating passage between a feedback member and a pressure gage guide without using a pressure introducing hole in the valve body wall or the bonnet wall.

A second object of the present invention is to provide a gage-in-handle type pressure reducing valve designed to minimize friction occurring in a mechanism for converting the rotation of the handle into an axial movement of the pressure regulating spring retainer.

To attain the above-described objects, the present invention is applied to a gage-in-handle type pressure reducing valve wherein a valve chamber is disposed between a primary-side port and a secondary-side port, and a main valve element in the valve chamber is urged toward a main valve seat by a valve spring. The main valve element is also urged away from the main valve seat by a pressure regulating spring fitted between a feedback member and a pressure regulating spring retainer. A pressure gage is disposed in a cylindrical handle, and a feedback chamber between the feedback member and the valve chamber communicates with the pressure gage through a pressure introducing communicating passage. According to a first arrangement of the present invention, a pressure regulating nut is rotatably supported in a bonnet. The pressure regulating nut has an internal thread. The pressure regulating spring retainer is supported in the bonnet so as to be axially movable but unable to rotate. The pressure regulating spring retainer has a tubular portion with an external thread. The internal thread of the pressure regulating nut is in engagement with the external thread of the tubular portion of the pressure regulating spring retainer. A pressure gage guide is connected to the pressure gage. The pressure gage guide is supported in the tubular portion of the pressure regulating spring retainer so that the pressure gage guide and the pressure regulating spring retainer are axially movable but unable to rotate relative to each other. A communicating hole is formed in the feedback member so as to communicate with the feedback chamber. The communicating hole is communicated with the pressure gage guide through a communicating line of the pressure introducing communicating passage. Rotation of the handle causes the pressure regulating nut to rotate, and this, in turn, causes the pressure regulating spring retainer to move axially.

According to a second arrangement of the present invention, the pressure regulating nut in the first arrangement is supported in a bearing hole provided in the bonnet. The pressure regulating nut has a flange at the lower end thereof and further has radial bolt holes in the upper end portion thereof. The pressure gage guide has an annular groove on the outer peripheral surface of the upper end portion thereof, so that the distal end portions of bolts screwed into the bolt holes of the pressure regulating nut are engaged with the annular groove of the pressure gage guide.

According to a third arrangement of the present invention, a hollow tube guide is slidably fitted in a sliding hole provided in the pressure gage guide in either of the first and second arrangements. The hollow tube guide has a first hollow connector. The feedback member has a second hollow connector communicating with the communicating hole. The first hollow connector and the second hollow connector are connected to each other by a flexible tube.

According to a fourth arrangement of the present invention, the pressure gage guide in either of the first and second arrangements has a third hollow connector, and the feedback member has a second hollow connector communicating with the communicating hole. The third hollow connector and the second hollow connector are connected to each other by a flexible coiled tube.

According to a fifth arrangement of the present invention, a pressure introducing part is provided between the pressure gage and the pressure gage guide in the second arrangement. The pressure introducing part has an engagement portion hermetically engaged with a large-diameter hole provided in the pressure gage guide.

According to a sixth arrangement of the present invention, the pressure gage guide in either of the first and second arrangements has a hollow guide portion at the distal end thereof. The feedback member has a hollow projecting portion with a sliding hole. The hollow guide portion is slidably and hermetically fitted in the sliding hole of the hollow projecting portion.

It should be noted that the term "communicating line" as used herein means a pipe, a pipe-shaped member, a tube, a tubular member, a hollow member, etc. having the function of providing communication, exclusive of a passage and a pressure introducing hole formed in the valve body wall or the bonnet wall. The term "a communicating line of the pressure introducing communicating passage" means that the communicating line is a part of the pressure introducing communicating passage. The third to sixth arrangements each limit the communicating line in the first arrangement.

According to the present invention, the feedback member is formed with a communicating hole communicating with the feedback chamber, and the communicating hole in the feedback member is communicated with the pressure gage guide through a communicating line. Therefore, the feedback chamber and the pressure gage can be communicated with each other through the communicating passage between the feedback member and the pressure gage guide without using a pressure introducing hole in the valve body wall or the bonnet wall. Accordingly, the structure is simplified, and the cost is reduced.

According to the present invention, further, a pressure regulating nut is rotatably supported in the bonnet, and a pressure regulating spring retainer is supported in the bonnet so as to be axially movable but unable to rotate. A pressure gage guide is connected to the pressure gage. The internal thread of the pressure regulating nut is engaged with an external thread formed on a tubular portion of the pressure regulating spring retainer. The pressure gage guide is supported in the tubular portion of the pressure regulating spring retainer so that the pressure gage guide and the pressure regulating spring retainer are axially movable but unable to rotate relative to each other. Accordingly, it is possible to minimize friction occurring in the mechanism for converting the rotation of the handle into an axial movement of the pressure regulating spring retainer.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
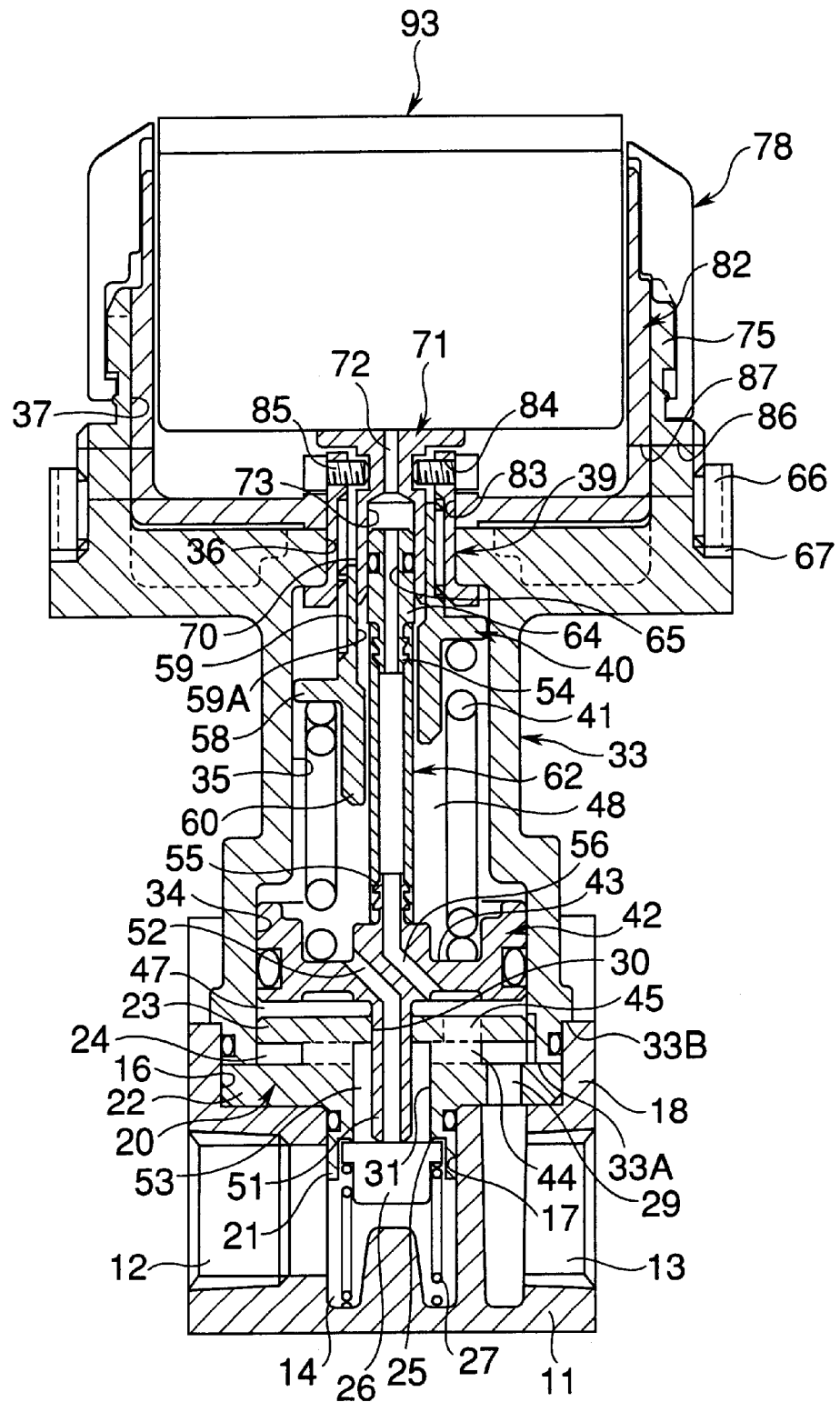
FIG. 1 is a vertical sectional view showing a first embodiment of the gage-in-handle type pressure reducing valve according to the present invention.

FIG. 1 shows a first embodiment of the gage-in-handle type pressure reducing valve according to the present invention. Although the terms "upper", "lower", "left", "right", etc. are used in the following description made in connection with FIG. 1, it should be noted that the directions change according to a change in installation position of the pressure reducing valve. The same shall apply to FIGS. 2 to 4.

A valve body 11 made of a metal or synthetic resin material is formed with a primary-side port 12 and a secondary-side port 13, which open on the side surfaces of the valve body 11. A valve chamber (primary pressure chamber) 14 and a secondary pressure chamber 53 are formed between the primary-side port 12 and the secondary-side port 13. The valve body 11 is formed with a stepped hole comprising a large-diameter hole 16 and a small-diameter hole 17. The upper end of the large-diameter hole 16 is open. An annular flat step portion is formed between the large-diameter hole 16 and the small-diameter hole 17. The inner surface of the small-diameter hole 17 forms the valve chamber 14 below a valve seat member 20 (described later). The valve chamber 14 communicates with the primary-side port 12. An upward projecting portion 18 is defined between the large-diameter hole 16 and the outer surface of the valve body 11. The valve seat member 20 has an annular projecting portion 21 and a lower flange 22 at the lower end thereof. The annular projecting portion 21 is fitted to the inner surface of the small-diameter hole 17. The lower flange 22 is fitted to the inner surface of the large-diameter hole 16. An O-ring is fitted in an annular groove on the outer periphery of the annular projecting portion 21 to hermetically seal the area between the outer periphery of the annular projecting portion 21 and the small-diameter hole 17.

A step portion is formed on the inner surface of the annular projecting portion 21 of the valve seat member 20 (the inner surface of the annular projecting portion 21 below the step portion is larger in diameter than the inner surface above the step portion). An annular main valve seat 25 is formed on the step portion. A main valve element 26 is placed below the main valve seat 25 to face opposite thereto so that the outer peripheral portion of the upper end surface of the main valve element 26 can abut on the main valve seat 25. The passage between the primary-side port 12 and the secondary-side port 13 is controlled by a supply valve comprising the main valve element 26 and the main valve seat 25. A valve spring 27 is fitted between a lower step portion of the main valve element 26 and a bottom surface of the valve chamber 14. The valve spring 27 urges the main valve element 26 toward the main valve seat 25. A bonnet 33 made of a metal or synthetic resin material is disposed on the upper side of the valve body 11. A small-diameter portion of the outer periphery at the lower end of the bonnet 33 is fitted into the large-diameter hole 16 of the valve body 11. An O-ring is fitted in an annular groove on the small-diameter portion of the outer periphery at the lower end of the bonnet 33 to hermetically seal the area between the small-diameter portion of the outer periphery at the lower end of the bonnet 33 and the large-diameter hole 16. A lower end surface 33A of the bonnet 33 abuts on the outer peripheral portion of the upper surface of the lower flange 22 of the valve seat member 20. A step portion 33B at the lower end of the bonnet 33 abuts on the inner peripheral side portion of the upper surface of the upward projecting portion 18. The bonnet 33 and the valve body 11 are connected to each other with bolts (not shown).

The bonnet 33 has an intermediate-diameter hole 34, a small-diameter hole 35, a bearing hole 36, and a large-diameter hole 37 formed therein in that order from the lower side of the bonnet 33. The lower end of the intermediate-diameter hole 34 and the upper end of the large-diameter hole 37 are open. A pressure regulating nut 39 is rotatably fitted into the bearing hole 36 from the lower side of the bearing hole 36. The pressure regulating nut 39 has a flange formed at the lower end thereof. The flange prevents the pressure regulating nut 39 from coming off upwardly. A pressure regulating spring retainer 40 is disposed in the small-diameter hole 35 so as to be movable in an axial direction (i.e. the longitudinal direction of the pressure reducing valve; in the vertical direction as viewed in FIG. 1) but unable to rotate. For this purpose, for example, a flange portion 58 with a hexagonal outer surface of the pressure regulating spring retainer 40 is engaged with the small-diameter hole 35 having a hexagonal sectional configuration. It should be noted that FIG. 1 shows the pressure regulating spring retainer 40 in two different positions at the left and right sides thereof. A piston (feedback member) 42 is slidably fitted in the intermediate-diameter hole 34. A pressure regulating spring 41 is fitted between the lower surface of the flange portion 58 of the pressure regulating spring retainer 40 and an annular groove 43 on the upper surface of the piston 42. It should be noted that an annular groove is formed on the outer periphery of the piston 42, and an O-ring is fitted in the annular groove to hermetically seal the area between the outer periphery of the piston 42 and the inner surface of the intermediate-diameter hole 34.

An upper flange 23 of the valve seat member 20 is fitted to the lower end portion of the intermediate-diameter hole 34 in the bonnet 33. An annular groove 24 is formed between the upper flange 23 and the lower flange 22 of the valve seat member 20. The annular groove 24 communicates with the secondary-side port 13 through a communicating hole 29 formed in the lower flange 22. An insertion hole 30 is formed in the center of the upper flange 23 of the valve seat member 20. A center hole 31 (larger in diameter than the insertion hole 30) is formed between the insertion hole 30 and the main valve seat 25. The inside of the center hole 31 forms the secondary pressure chamber 53. A plurality of horizontal communicating holes 44 are formed between the upper end portion of the center hole 31 and the annular groove 24. Feedback holes 45 are formed between the communicating holes 44 and the upper surface of the valve seat member 20.

A feedback chamber 47 is formed in the intermediate-diameter hole 34 of the bonnet 33 between the piston 42 and the valve seat member 20. A spring chamber 48 is formed above the piston 42 in the intermediate-diameter hole 34 and the small-diameter hole 35. The spring chamber 48 communicates with the atmosphere through the bearing hole 36 and the large-diameter hole 37. A hollow rod 51 projects from the center of the lower side of the piston 42. The hollow rod 51 is inserted into the insertion hole 30 of the valve seat member 20 to extend through the secondary pressure chamber 53 so that the lower end (distal end) of the hollow rod 51 can abut on the flat upper surface of the main valve element 26. The bore in the hollow rod 51 communicates with the spring chamber 48 above the piston 42 through a communicating hole 52 extending through the piston 42. When the lower end of the hollow rod 51 (discharge valve element) is separate from the upper surface (discharge valve seat) of the main valve element 26 (i.e. when the discharge valve is open), the secondary pressure chamber 53 is communicated with the spring chamber 48 through the bore in the hollow rod 51 and the communicating hole 52 in the piston 42. Consequently, the gas in the secondary pressure chamber 53 is discharged into the atmosphere. When the lower end of the hollow rod 51 abuts on the upper surface of the main valve element 26 (i.e. when the discharge valve is closed), communication between the secondary pressure chamber 53 and the spring chamber 48 (atmosphere) is cut off.

A central projecting portion is formed inside the annular groove 43 on the upper surface of the piston 42. The upper end of the central projecting portion forms a second hollow connector 55. The bore in the second hollow connector 55 communicates with the feedback chamber 47 through a communicating hole 56 formed in the piston 42. A disengagement preventing portion is formed on the outer surface of the second hollow connector 55 to prevent the second hollow connector 55 from disengaging from a communicating tube 62 (described below). The second hollow connector 55 is inserted into the lower end portion of the communicating tube 62, and the outer surface of the second hollow connector 55 is engaged with the inner surface of the lower end portion of the communicating tube 62 (an adhesive may be applied to the engaged portion). The area between the inner peripheral surface of the lower end portion of the communicating tube 62 and the outer peripheral surface of the second hollow connector 55 is hermetically sealed. It should be noted that the communicating tube 62 is made of a synthetic resin or metallic material. It is preferable to use nylon, urethane, or vinyl chloride.

The outer periphery of the pressure regulating nut 39 is so shaped that a portion of the pressure regulating nut 39 that is engaged with the bearing hole 36 has a circular sectional configuration and a portion of the pressure regulating nut 39 above the circular portion, which is engaged with a hexagonal center hole 83 of a handle guide 82, has a hexagonal sectional configuration. The pressure regulating spring retainer 40 is integrally formed with a tubular portion 59 above the flange portion 58. A lower tubular portion 60 is formed below the flange portion 58. An internal thread is formed on the inner surface of the pressure regulating nut 39 (except the upper end portion). An external thread is formed on the outer surface of the tubular portion 59 of the pressure regulating spring retainer 40. The internal thread of the pressure regulating nut 39 is engaged with the external thread of the pressure regulating spring retainer 40. The pressure regulating spring retainer 40 is urged upward by the pressure regulating spring 41. The pressure regulating nut 39, which is in thread engagement with the pressure regulating spring retainer 40, is also urged upward. The handle guide 82, which has an approximately bowl-shaped configuration, is rotatably disposed in the large-diameter hole 37 of the bonnet 33. The hexagonal center hole 83 of the handle guide 82 is engaged with the outer surface of the pressure regulating nut 39 that has a hexagonal sectional configuration.

A cylindrical handle 78 is rotatably fitted to the outer surface a thin-walled cylindrical portion 75 at the upper end of the bonnet 33. The inner surface of the handle 78 is connected to the outer surface of the upper end portion of the handle guide 82 through splines. A pressure gage guide 71 is secured to the lower surface of a pressure gage 93. An outer peripheral surface 70 of the pressure gage guide 71 is engaged with the inner surface 59A of the tubular portion 59 of the pressure regulating spring retainer 40 so that the pressure gage guide 71 and the pressure regulating spring retainer 40 are axially movable but unable to rotate relative to each other. For example, the outer peripheral surface of the pressure gage guide 71 has a hexagonal sectional configuration, and the inner surface of the tubular portion 59 has a hexagonal sectional configuration. A plurality of radial bolt holes 84 are formed in the upper end portion of the pressure regulating nut 39. An annular groove is formed on the outer peripheral surface of the upper end portion of the pressure gage guide 71. The distal end portions of bolts 85 screwed into the bolt holes 84 of the pressure regulating nut 39 are engaged with the annular groove of the pressure gage guide 71. By this engagement, the position of the pressure gage guide 71 in the axial direction (vertical direction) is locked, and the pressure gage 93 is supported by the pressure gage guide 71. It should be noted that insertion holes 86 of the bonnet 33 and insertion holes 87 of the handle guide 82 are used when the bolts 85 are screwed into the bolt holes 84.

The pressure gage guide 71 is formed with a communicating hole 72 and a sliding hole 73. The communicating hole 72 provides communication between the sliding hole 73 and the inside of the pressure gage 93. A hollow tube guide 64 is slidably fitted in the sliding hole 73. An annular groove is formed on the outer periphery of the hollow tube guide 64.

An O-ring is fitted in the annular groove to hermetically seal the area between the outer peripheral surface of the hollow tube guide 64 and the sliding hole 73 of the pressure gage guide 71. A first hollow connector 54 is formed at the lower end of the hollow tube guide 64. A disengagement preventing portion is formed on the outer surface of the first hollow connector 54 to prevent the first hollow connector 54 from disengaging from the communicating tube 62. The first hollow connector 54 is inserted into the upper end portion of the communicating tube 62, and the outer surface of the first hollow connector 54 is engaged with the inner surface of the upper end portion of the communicating tube 62 (an adhesive may be applied to the engaged portion). The area between the inner peripheral surface of the upper end portion of the communicating tube 62 and the outer peripheral surface of the first hollow connector 54 is hermetically sealed. With the foregoing arrangement, the gas pressure in the feedback chamber 47 (secondary-side port 13) is introduced into the pressure gage 93 through the communicating hole 56 and second hollow connector 55 of the piston 42, the communicating tube 62, the first hollow connector 54 and communicating hole 65 of the hollow tube guide 64, and the sliding hole 73 and communicating hole 72 of the pressure gage guide 71. Thus, the gas pressure in the feedback chamber 47 (secondary-side port 13) can be measured with the pressure gage 93. It should be noted that the bonnet 33 is fitted into a hole in a panel (not shown), and the bonnet 33 is secured to the panel by using a panel gasket 67 and a panel nut 66.

In the first embodiment of the present invention, when the handle 78 is rotated, the rotational motion of the handle 78 is transmitted to the pressure regulating nut 39 through the handle guide 82, causing the pressure regulating nut 39 to rotate. Because the internal thread of the pressure regulating nut 39 and the external thread of the tubular portion 59 of the pressure regulating spring retainer 40 are in engagement with each other, the rotational motion of the pressure regulating nut 39 is converted into an axial motion (reciprocating motion) of the pressure regulating spring retainer 40. Thus, a pressure of the pressure reducing valve is set. In the small-diameter hole 35 of the bonnet 33, the pressure regulating spring retainer 40 is disposed so as to be axially movable but unable to rotate. The inner surface 59A of the tubular portion 59 of the pressure regulating spring retainer 40 and the outer peripheral surface 70 of the pressure gage guide 71 are engaged so that the pressure gage guide 71 and the pressure regulating spring retainer 40 are axially movable but unable to rotate relative to each other. The pressure gage guide 71 is secured to the pressure gage 93. Accordingly, even when the handle 78 is rotated to cause the handle guide 82 and the pressure regulating nut 39 to rotate, the pressure gage 93 does not rotate, and the position of the scale of the pressure gage 93 does not move. Therefore, it is easy to read a numerical value indicated by the pointer of the pressure gage 93.

Figure 2:
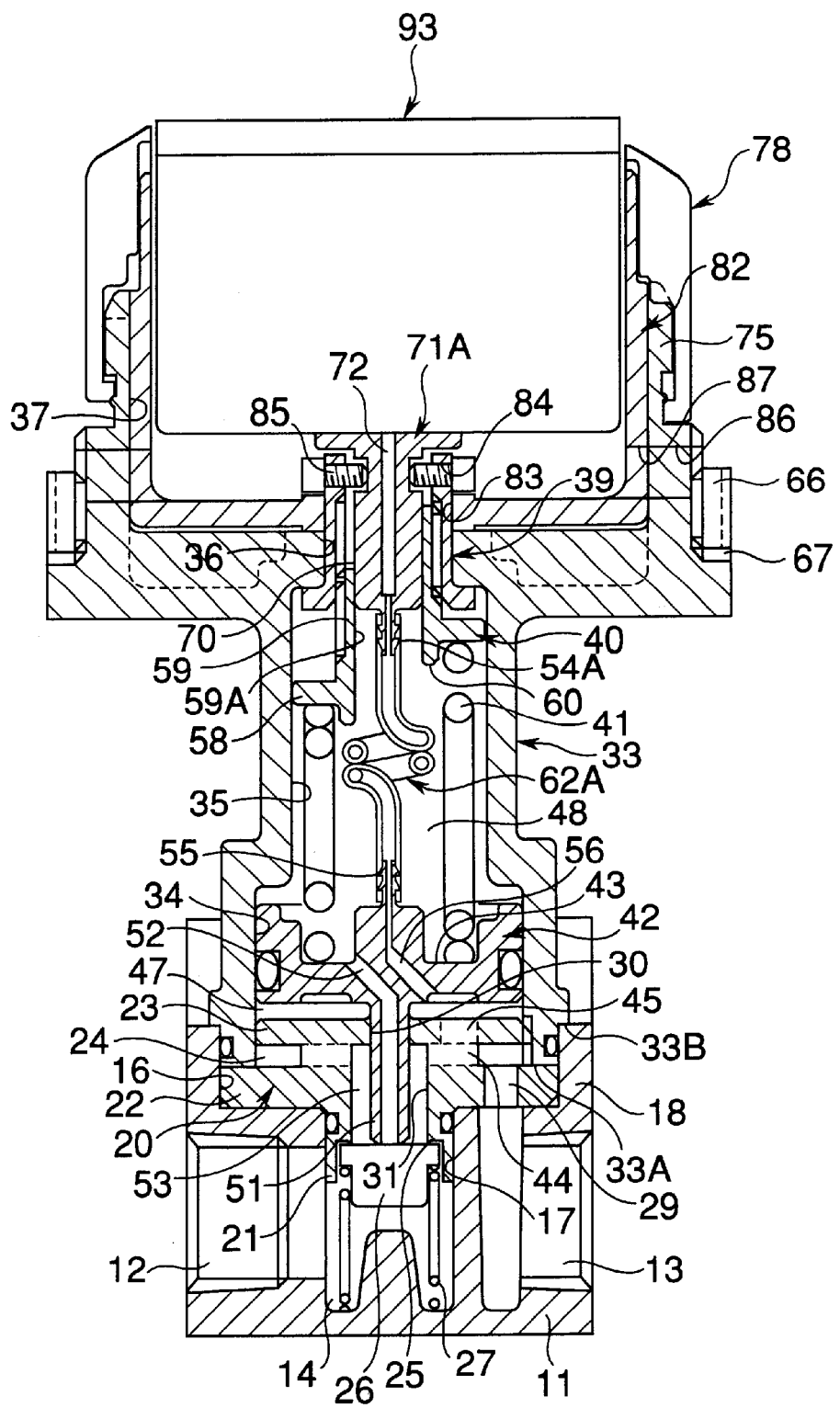
FIG. 2 is a vertical sectional view showing a second embodiment of the present invention.

FIG. 2 shows a second embodiment of the gage-in-handle type pressure reducing valve according to the present invention. The feature of the second embodiment resides in that the third hollow connector 54A of the pressure gage guide 71A and the second hollow connector 55 of the piston 42 are connected by a communicating coiled tube 62A. No communicating tube 62 is used in this embodiment. The pressure gage guide 71A has the third hollow connector 54A integrally formed at the lower end thereof. The lower end of the communicating hole 72 in the pressure gage guide 71A communicates with the bore in the third hollow connector 54A. The rest of the arrangement and function of the second embodiment is the same as that of the first embodiment. In FIG. 2, the same members as those in FIG. 1 are denoted by the same reference numerals as in FIG. 1, and a description thereof is omitted.

Figure 3:
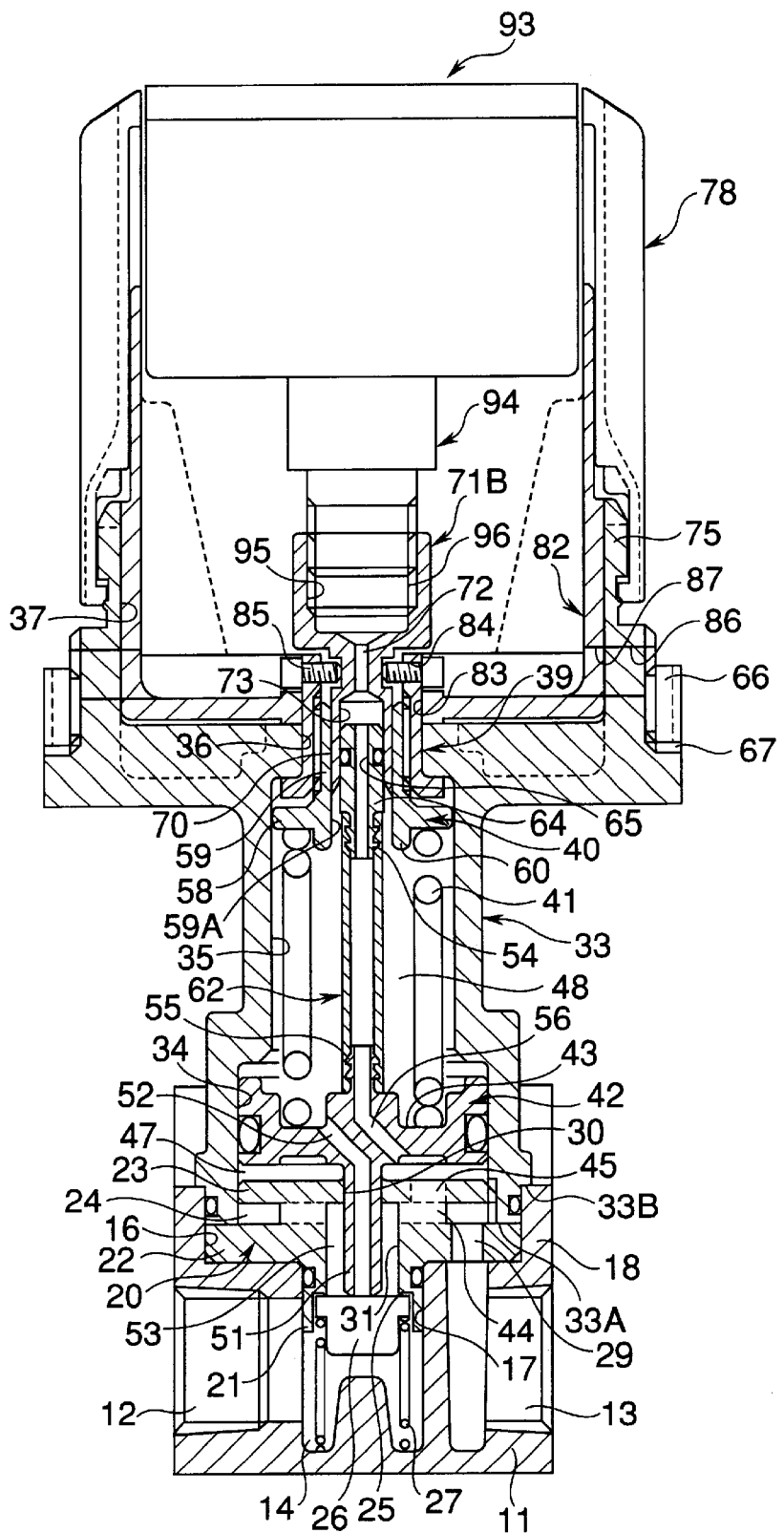
FIG. 3 is a vertical sectional view showing a third embodiment of the present invention.

FIG. 3 shows a third embodiment of the gage-in-handle type pressure reducing valve according to the present invention. The third embodiment is similar to the first embodiment except that a pressure introducing part 94 is provided between the pressure gage 93 and the pressure gage guide 71B, and an engagement portion 96 of the pressure introducing part 94 is hermetically engaged with a large-diameter hole 95 of the pressure gage guide 71B. It should be noted that the arrangement may be such that the engagement portion 96 of the pressure introducing part 94 is formed with an external thread, and the large-diameter hole 95 of the pressure gage guide 71B is formed with an internal thread, and further the area between the engagement portion 96 of the pressure introducing part 94 and the large-diameter hole 95 of the pressure gage guide 71B is hermetically sealed with an O-ring or the like. The rest of the arrangement and function of the third embodiment is the same as that of the first embodiment. In FIG. 3, the same members as those in FIG. 1 are denoted by the same reference numerals as in FIG. 1, and a description thereof is omitted.

Figure 4:
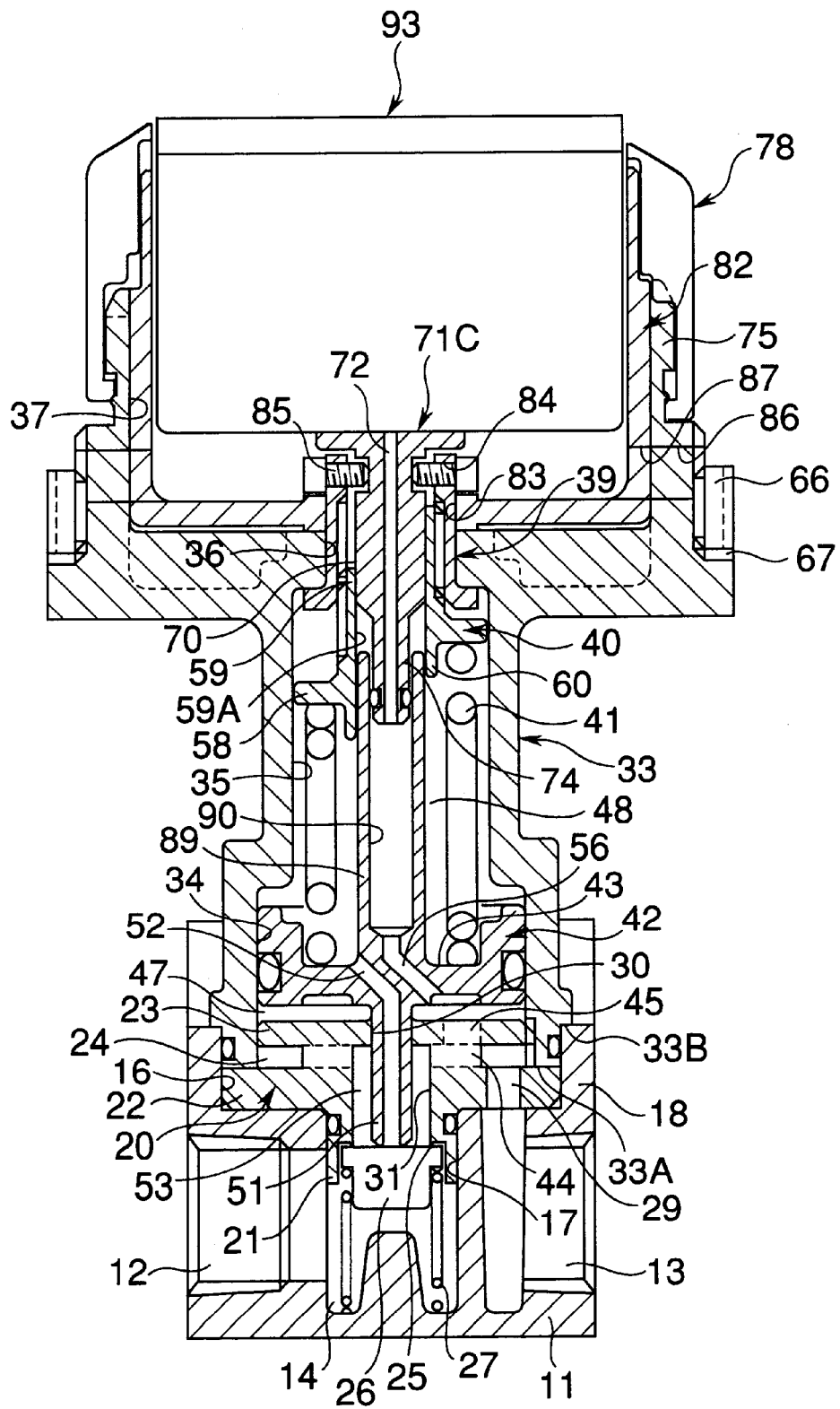
FIG. 4 is a vertical sectional view showing a fourth embodiment of the present invention.

FIG. 4 shows a fourth embodiment of the gage-in-handle type pressure reducing valve according to the present invention. The fourth embodiment is similar to the first embodiment except that the pressure gage guide 71C has a hollow guide portion 74 integrally formed at the lower end thereof, and the piston 42 (feedback member) has a hollow projecting portion 89 integrally formed on the upper surface thereof, and further a sliding hole 90 is formed in the hollow projecting portion 89. In addition, the hollow guide portion 74 of the pressure gage guide 71C is slidably and hermetically fitted in the sliding hole 90 of the hollow projecting portion 89. The pressure gage guide 71C communicates with the feedback chamber 47 through the hollow guide portion 74 and the hollow projecting portion 89. No communicating tube 62 is used in this embodiment. The rest of the arrangement and function of the fourth embodiment is the same as that of the first embodiment. In FIG. 4, the same members as those in FIG. 1 are denoted by the same reference numerals as in FIG. 1, and a description thereof is omitted.

What is claimed is:

1. In a gage-in-handle type pressure reducing valve of the type wherein a valve chamber is disposed between a primary-side port and a secondary-side port, and a main valve element in said valve chamber is urged toward a main valve seat by a valve spring, said main valve element being urged away from said main valve seat by a pressure regulating spring fitted between a feedback member and a pressure regulating spring retainer, and further a pressure gage is disposed in a cylindrical handle, and a feedback chamber between said feedback member and said valve chamber communicates with said pressure gage through a pressure introducing communicating passage, the improvement which comprises:

a pressure regulating nut rotatably supported in a bonnet, said pressure regulating nut having an internal thread;

said pressure regulating spring retainer being supported in said bonnet so as to be axially movable but unable to rotate, said pressure regulating spring retainer having a tubular portion with an external thread, wherein said internal thread of said pressure regulating nut is in engagement with said external thread of the tubular portion of said pressure regulating spring retainer;

a pressure gage guide connected to said pressure gage, said pressure gage guide being supported in the tubular portion of said pressure regulating spring retainer so that said pressure gage guide and said pressure regulating spring retainer are axially movable but unable to rotate relative to each other; and a communicating hole formed in said feedback member so as to communicate with said feedback chamber, said communicating hole being communicated with said pressure gage guide through a communicating line of said pressure introducing communicating passage;

wherein rotation of said handle causes said pressure regulating nut to rotate, and this, in turn, causes said pressure regulating spring retainer to move axially.

2. A gage-in-handle type pressure reducing valve according to claim 1, wherein said pressure regulating nut is supported in a bearing hole provided in said bonnet, said pressure regulating nut having a flange at a lower end thereof, said pressure regulating nut further having radial bolt holes in an upper end portion thereof, and said pressure gage guide has an annular groove on an outer peripheral surface of an upper end portion thereof, so that distal end portions of bolts screwed into the bolt holes of said pressure regulating nut are engaged with the annular groove of said pressure gage guide.

3. A gage-in-handle type pressure reducing valve according to claim 1, wherein a hollow tube guide is slidably fitted in a sliding hole provided in said pressure gage guide, said hollow tube guide having a first hollow connector, and said feedback member has a second hollow connector communicating with said communicating hole, said first hollow connector and said second hollow connector being connected to each other by a flexible tube.

4. A gage-in-handle type pressure reducing valve according to claim 2, wherein a hollow tube guide is slidably fitted in a sliding hole provided in said pressure gage guide, said hollow tube guide having a first hollow connector, and said feedback member has a second hollow connector communicating with said communicating hole, said first hollow connector and said second hollow connector being connected to each other by a flexible tube.

5. A gage-in-handle type pressure reducing valve according to claim 1, wherein said pressure gage guide has a third hollow connector, and said feedback member has a second hollow connector communicating with said communicating hole, said third hollow connector and said second hollow connector being connected to each other by a flexible coiled tube.

6. A gage-in-handle type pressure reducing valve according to claim 2, wherein said pressure gage guide has a third hollow connector, and said feedback member has a second hollow connector communicating with said communicating hole, said third hollow connector and said second hollow connector being connected to each other by a flexible coiled tube.

7. A gage-in-handle type pressure reducing valve according to claim 2, wherein a pressure introducing part is provided between said pressure gage and said pressure gage guide, said pressure introducing part having an engagement portion hermetically engaged with a large-diameter hole provided in said pressure gage guide.

8. A gage-in-handle type pressure reducing valve according to claim 1, wherein said pressure gage guide has a hollow guide portion at a distal end thereof, and said feedback member has a hollow projecting portion with a sliding hole, said hollow guide portion being slidably and hermetically fitted in the sliding hole of said hollow projecting portion.

9. A gage-in-handle type pressure reducing valve according to claim 2, wherein said pressure gage guide has a hollow guide portion at a distal end thereof, and said feedback member has a hollow projecting portion with a sliding hole, said hollow guide portion being slidably and hermetically fitted in the sliding hole of said hollow projecting portion.

* * * * *